FRANKING MACHINES

Filed Feb. 25, 1963 2 Sheets-Sheet 1

FRANKING MACHINES 3,259,313
Patented July 5, 1966

3,259,313

FRANKING MACHINES

Leslie Harold Smith, Romford, England, assignor to Roneo-Neopost Limited, Richmond, England Filed Feb. 25, 1963, Ser. No. 260,475
Claims priority, application Great Britain, May 9, 1962, 17,891/62
2 Claims. (Cl. 235—101)

The present invention relates to franking machines of the kind comprising a rotary head on which are housed the devices for selecting the values to be stamped, printing wheels and a register unit, characterised in that each printing wheel is permanently connected with the corresponding value-selecting device by means of a train of pinions, whereby the person using the machine can be absolutely certain that the position of the appropriate printing wheel will correspond to the value selected. Furthermore, each value-selecting device comprises a selecting lever rigidly connected with a disc having a set of teeth, which co-operates with the printing wheels.

In this construction the value-selecting device comprises a disc mounted below the casing of the machine and provided with a radial operating lever which protrudes through a slot in the casing and by means of which the disc is rotated to the desired value. It is a disadvantage of this form of construction that access to the recording meters and other internal mechanisms can be readily obtained through the slot through which the lever protrudes, and it is the object of the present invention to overcome this disadvantage.

The invention consists in a franking machine of the kind referred to characterised in that the value-selecting device comprises a disc mounted within the casing of the machine co-axial with a part cylindrical portion of the latter and in line with a circumferential slot in the same and of a diameter sufficient for the edge of the disc to protrude from the slot, part at least of the edge of the disc being provided with serrations.

The invention further consists in a franking machine as set forth in the preceding paragraph in which the serrations are provided in one or more recesses in the edge of the disc for the entry of the tip of a finger or thumb.

The invention further consists in a franking machine as set forth in the preceding paragraph further characterised in that the value-selecting device includes a second disc having a set of internal teeth co-operating with the value-printing wheels of the machine.

The invention still further consists in a franking machine as set forth above further characterised in that the value-selecting device includes a third disc provided with a guiding groove allowing the movement of teeth co-operating with the adding device.

The accompanying drawings show, by way of example only, one embodiment of the invention in which:

FIGURE 3 is a side view of the selecting device showing in addition a second and third disc; while

Figures 1, 2:
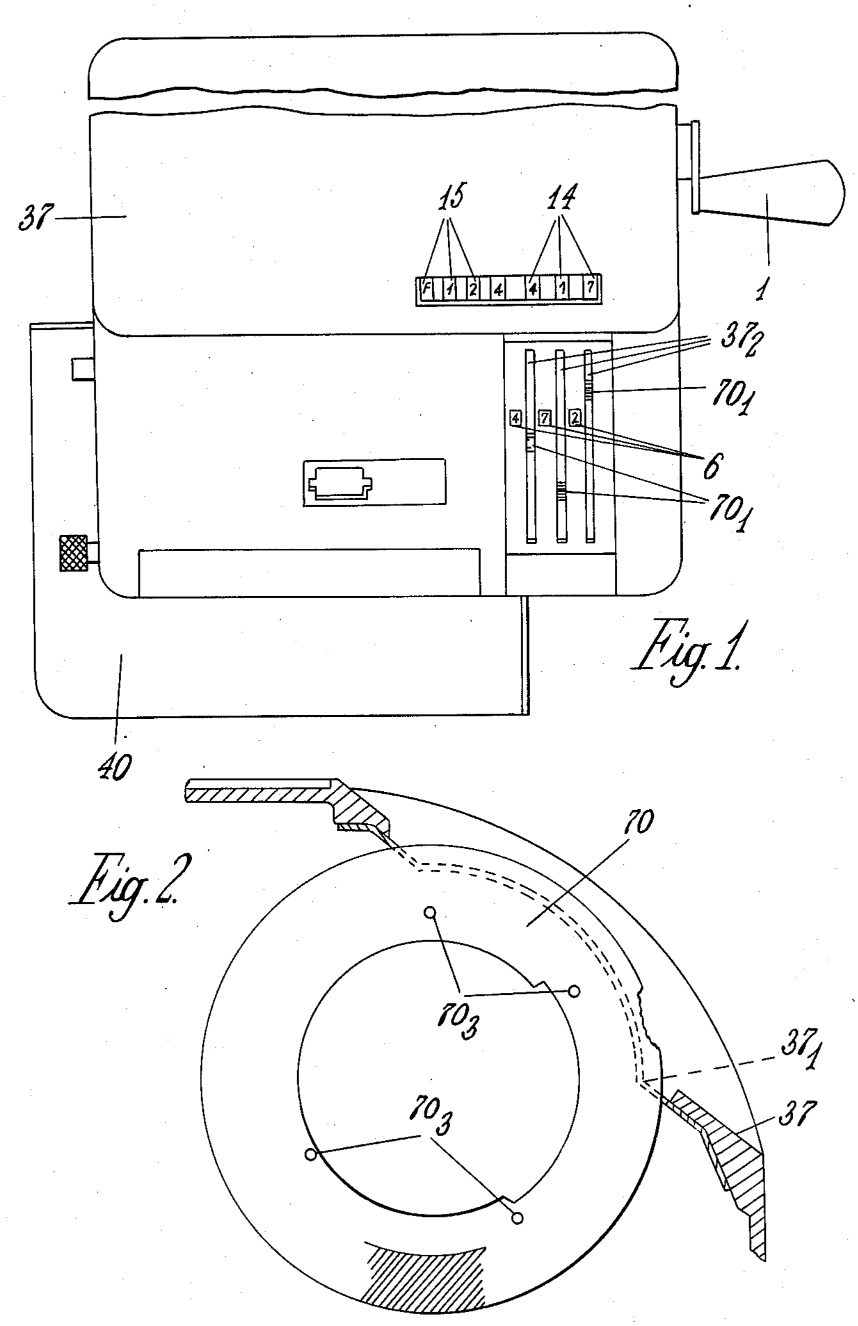
FIGURE 1 is an external plan view of the machine.
FIGURE 2 is a side view of the first disc of the value-selecting device.

The machine according to the invention and shown in FIGURE 1 comprises printing wheels (not shown), moved by handle 1 and selecting means allowing the operator to select a franking value, this value being carried over on the one hand to the adding unit 14–15 and on the other hand to a position indicator 6, on which the values selected by the operator are posted.

The machine comprises a tray 40 for the introduction of the letters to be franked into the machine, and a casing 37 having an attached plate $37_1$ in which are formed slots $37_2$ allowing the movement of the disc 70 of the selecting device (described hereunder).

Figure 3:
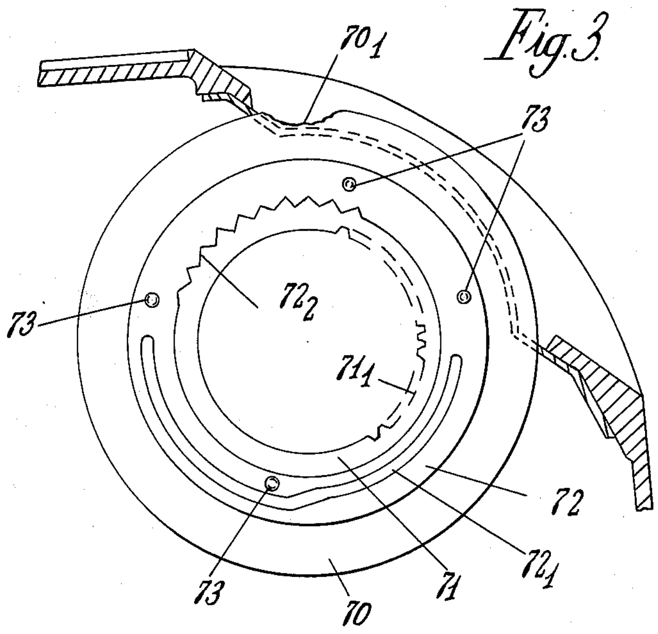
Figure 4:
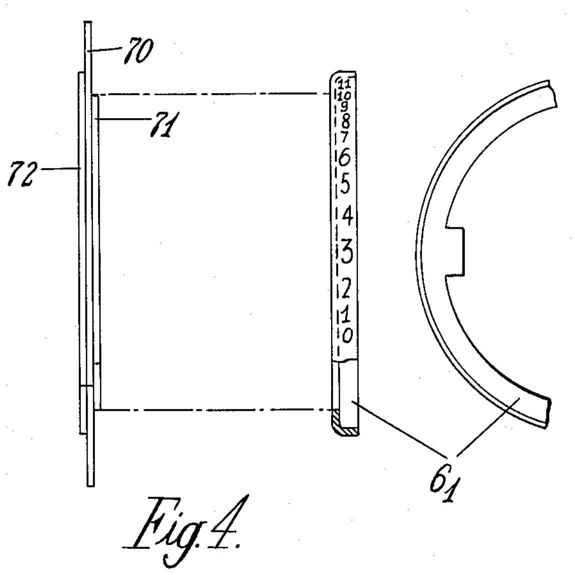
FIGURE 4 is an edge on view of the value-selecting device.

The selecting device to which the present improvement relates is shown in FIGURES 2 to 4.

This selecting device comprises principally a disc 70 on the periphery of which is provided a serrated edged semi-circular recess $70_1$ for the entry of the tip of a finger or thumb, the diameter of the disc 70 being such as to protrude from the slot in the casing $37_1$ in which it works as shown in FIGURE 2.

The diameter of disc 70 is such that it is impossible to introduce between the periphery of disc 70 and the casing of the machine, an instrument such as a rod allowing a defrauder to act on the adding devices of said machine. Also as shown in FIGS. 2 and 3, the bottom of the recess $70_1$ terminates outwardly of the arcuate wall portion $37_1$ of the casing 37. This prevents entry of a foreign member or instrument through the recess $70_1$.

Moreover, the selecting device likewise comprises a disc 71, which is provided with an internal set of teeth $71_1$ adapted to co-operate with pinions solid with the printing wheels for the purpose of transmitting to the latter the values selected by the user. The disc 71 supports and co-operates with cupped indicating wheel $6_1$ which is part of position indicator 6 on which are indicated the values corresponding to the positions of the various selecting devices.

Furthermore, the selecting device likewise comprises a disc 72 carrying a guiding groove $72_1$ in which engage the heads of teeth co-operating with the adding devices 14–15.

By the positioning of the disc 72 in relation to the casing the required number of teeth are caused to project beyond the periphery of the rotary head by the groove $72_1$, thereby ensuring that upon operation of the machine the figure corresponding to that selected by means of the selecting disc is provided, and the correct sum of money recorded upon the adding devices 14–15.

Moreover, the disc 72 is likewise provided with an internal set of teeth $72_2$ which co-operate with a spring loaded plunger, not shown, to locate the value-selecting device at each value selected by the operator, that is to say corresponding to each specific position of the position indicator 6.

The discs 70, 71 and 72 are solid with one another face to face, as shown in FIGURE 4, by means of fixing means, such as rivets 73, for example.

It is to be understood that the above description is by way of example only and that details for carrying the invention into effect may be varied without departing from the scope of the invention claimed.

I claim:

1. A franking machine comprising a casing including an arcuate wall portion having spaced parallel slots therein, a plurality of members corresponding to units, tens, hundreds and the like rotatably mounted in said casing, a each member including a disc with a portion thereof projecting through one of said slots, each disc being of a thickness and diameter to completely fill the associated slot from end to end to prevent the entry of a foreign member through said slot at the sides or ends thereof by said discs into said casing, and each disc having a fingertip receiving recess in the peripheral edge thereof projecting through each slot, the bottom of each recess terminating outwardly of the adjacent arcuate wall portion to prevent entry of a foreign member through said recess into said casing.

2. A franking machine as defined in claim 1 in which fingertip engaging serrations are provided in the surface of each recess.

References Cited by the Examiner

UNITED STATES PATENTS

| | | | |
|---|---|---|---|
| 834,506 | 2/1907 | Trinks | 235—81.50 |
| 1,035,066 | 8/1912 | Witsell | 235—80 |
| 1,308,510 | 7/1919 | Rudin | 235—81.50 |
| 1,309,872 | 7/1919 | Anderson | 235—81.50 |
| 1,348,576 | 8/1920 | Odhner | 235—81.50 |
| 1,476,197 | 12/1923 | Friden | 235—81.50 |
| 1,661,605 | 3/1928 | Ekman | 235—80 |
| 2,911,148 | 11/1959 | Lowell | 235—80 |

FOREIGN PATENTS

| | | |
|---|---|---|
| 135,109 | 10/1933 | Austria. |
| 1,207,974 | 2/1960 | France. |

LEO SMILOW, *Primary Examiner.*

J. A. SPELDRICH, C. G. COVELL, *Assistant Examiners.*